UNITED STATES PATENT OFFICE.

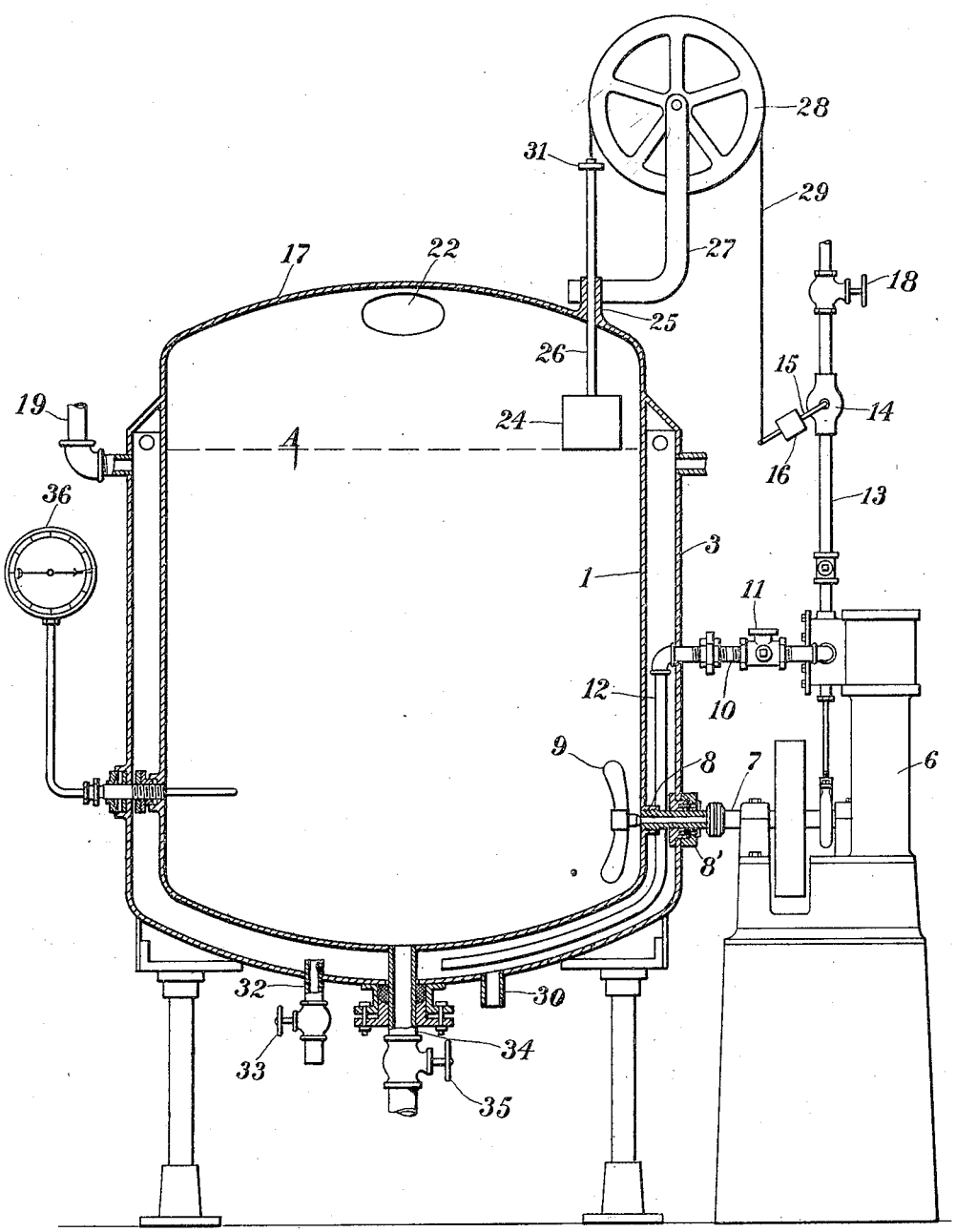

NIELS D. NIELSEN, OF ELYRIA, OHIO.

FLUID-AGITATING APPARATUS.

1,375,168. Specification of Letters Patent. Patented Apr. 19, 1921.

Application filed January 17, 1919. Serial No. 271,569.

*To all whom it may concern:*

Be it known that I, NIELS D. NIELSEN, a citizen of the United States, residing at Elyria, in the county of Lorain and State of Ohio, have invented certain new and useful Improvements in Fluid-Agitating Apparatus; and I do hereby declare the following to be a full, clear, and exact description of the invention, such as will enable others skilled in the art to which it appertains to make and use the same.

My invention relates to apparatus for agitating the contents of vessels and the like, and has for one of its objects the construction of apparatus that will actuate the agitating means in proportion to the amount of the liquid.

Another object is to introduce heat around the apparatus in proportion to the amount of liquid therein, whereby the temperature in the jacket will be maintained substantially the same, regardless of the amount of liquid.

Other objects of the invention will appear in the following description, reference being had to the drawing, in which—

The single figure of the drawing is a partial sectional elevation through the apparatus embodying the invention.

Referring to the drawings, a tank 1, which is adapted to contain fluid to be heated, or cooled, is surround by a suitable jacket member 3, which may be secured to the tank in any way. A source of power, such as a steam engine 6 or a steam turbine, is connected to a shaft 7 extending through bushings 8 and 8' secured in the tanks 1 and 3, respectively. A propeller 9 is secured to the end of the shaft 7 and preferably arranged closely adjacent to the side of the tank.

The engine 6 has its exhaust pipe 10 extending through a three-way valve 11 and into the space between the jacket and the tank by a suitable extension 12. The intake pipe 13 of the engine is connected to a source of steam (not shown) through a cut-off and throttling valve 14, which is operated by means of a pivoted arm 15 carrying a weight 16 adapted to be adjusted thereto to bias the valve to the on-position. The cover 17 for the top of the tank 1 may have one or more openings or peep holes 22, closed by any suitable means.

Inside the tank is suitably arranged a float 24 adapted to operate the cut-off and throttling valve 15 by any appropriate arrangements, which, by way of example, may be as shown in the drawing. In this particular embodiment of the idea, the cover 17 has a nipple projection 25, through which the float rod 26 passes to the exterior of the tank. A standard 27 carrying a pulley 28 is secured or clamped to the nipple 25, though it obviously may be fastened in other ways. A cord or cable 29 is secured at one end to the arm 15 and passes over pulley 28, where the other end is secured to rod 26.

The operation of my improvement is as follows: After the tank is filled with the liquid to be heated and agitated, the valve 18 is opened to admit steam to the pipe 13, and if the tank is substantially full, as shown in the drawing, the valve 15 will be held open by the weight to the full extent, and the steam engine will be operated at full capacity. The propeller 9 will, therefore, be actuated at the predetermined maximum speed, which will thoroughly agitate the large quantity of liquid in the tank. At the same time, the maximum amount of steam used to run the propeller will be exhausted through the pipe 12 into the jacket space around the tank, which will furnish maximum amount of heat for raising the temperature of the liquid 2. The uncondensed steam passes out to the atmosphere through a suitable pipe 10, and the water condensed from the steam flows through pipe 30 arranged in the lower part of the jacket member.

If the tank has been filled to the level indicated by the dotted line A, the float would occupy a lower position and permit the weight to lower the valve lever 15 to partially cut off or throttle the steam passing to the engine through pipe 13. This would reduce the speed in the engine and cause the propeller to rotate at lower speed, which would be sufficient, however, to agitate the reduced quantity of liquid substantially the same amount as when the tank was full. The reduced amount of exhaust coming to the engine through pipe 12 also would furnish less heat for the liquid in the tank, and would raise it to substantially the same temperature as when the tank was full, with the engine running under full head of steam.

It will be apparent that the float 24 will regulate the engine to actuate the propeller in proportion to the amount of liquid in the tank, and the heating will also be similarly proportioned. In order to prevent the float from engaging the propeller, a stop 31 may be arranged on the rod 26, which will engage the end of the nipple 25 in the lowermost position.

At certain times, for instance, when the liquid is being cooled, the valve 11 can be turned so as to cut off the exhaust from the jacket space and permit its escape outside the apparatus. In cases where it is desirable to furnish additional heat to the jacket, a pipe 32 may be used, which will admit steam in the required amount through the jacket. A valve 33 may be used to shut off or adjust the steam coming through this auxiliary pipe.

The liquid contents of the tank 1 may be drained off after being properly treated by means of a suitable pipe 34, which has a valve 35 to permit this.

A thermometer 36 permits the reading of temperature.

While I have shown a particular type of apparatus in the drawing to explain my invention, it will be apparent that this is only by way of example, and that the invention is not limited to the form disclosed. Changes in this may be made without departing from the scope of the invention.

I claim:

1. In combination, a tank adapted to contain a liquid, means for stirring the liquid and means controlling the first mentioned means to cause the liquid moved by said stirring means to be substantially proportional to the amount of liquid in the tank.

2. In combination, a tank adapted to contain a liquid, an engine having a shaft passing into said tank, a stirring device secured to the end of said shaft and means for throttling the said engine to rotate at a speed substantially proportional to the amount of liquid in the tank.

3. In combination, a tank adapted to contain a liquid, an engine having a shaft extending into said tank, a stirring device on the end of said shaft inside the tank, a float in said tank, a valve in the feed pipe of said engine and mechanism between said float and said valve to throttle the engine substantially inversely proportional to the amount of liquid in the tank.

4. In combination, a tank adapted to contain a liquid, a steam engine having a shaft extending into said tank, a stirring device on the end of said shaft inside the tank, a float inside the tank, a feed pipe connected to the engine, a throttling valve therein, a pulley supported above the float and flexible means connected to said float and said valve passing over the pulley, whereby the throttling valve is positioned in proportion to the amount of fluid in the tank.

In witness whereof, I have hereunto signed may name this 27 day of December, 1918.

NIELS D. NIELSEN.